United States Patent
Aslandere et al.

(10) Patent No.: US 12,387,087 B2
(45) Date of Patent: Aug. 12, 2025

(54) ELECTRIFIED VEHICLE WITH INDICATION OF ADEQUATE DRIVING RANGE BASED ON AUTOENCODER

(71) Applicant: FORD GLOBAL TECHNOLOGIES, LLC, Dearborn, MI (US)

(72) Inventors: Turgay Isik Aslandere, Aachen (DE); Nicole Leonarda Wilhelmina Eikelenberg, Meerssen (NL)

(73) Assignee: Ford Global Technologies, LLC, Dearborn, MI (US)

(*) Notice: Subject to any disclaimer, the term of this patent is extended or adjusted under 35 U.S.C. 154(b) by 1005 days.

(21) Appl. No.: 17/400,319

(22) Filed: Aug. 12, 2021

(65) Prior Publication Data
US 2022/0055488 A1 Feb. 24, 2022

(30) Foreign Application Priority Data
Aug. 20, 2020 (DE) .......................... 102020210561.8

(51) Int. Cl.
*G06N 3/0455* (2023.01)
*B60L 15/20* (2006.01)
(Continued)

(52) U.S. Cl.
CPC ........ *G06N 3/0455* (2023.01); *B60L 15/2045* (2013.01); *B60L 50/60* (2019.02);
(Continued)

(58) Field of Classification Search
CPC ...... G06N 3/0455; G06N 3/094; G06N 3/045; G06N 3/088; B60L 15/2045; B60L 50/60;
(Continued)

(56) References Cited

U.S. PATENT DOCUMENTS 10,336,213 B2 * 7/2019 Geuß .............. B60W 30/18127
12,083,926 B2 * 9/2024 Trnka ...................... G07C 5/085
(Continued)

OTHER PUBLICATIONS

Li et al., "Big data driven lithium-ion battery modeling method based on SDAE-ELM algorithm and data pre-processing technology" Mar. 23, 2019, pp. 1259-1273. (Year: 2019).*
(Continued)

*Primary Examiner* — Miranda M Huang
*Assistant Examiner* — Chase P. Hinckley
(74) *Attorney, Agent, or Firm* — David B. Kelley; Brooks Kushman PC (57) ABSTRACT

An electrified vehicle and associated method for controlling an electrified vehicle having an electric machine powered by a traction battery include an autoencoder trained with training data indicative of a remaining driving range of the traction battery. The trained autoencoder processes vehicle operating data to generate a reference data record and determines a value indicative of a similarity between the vehicle operating data and the reference data record. The autoencoder generates an output data record if the value indicative of the similarity is below a predetermined threshold value. The output data record may be used to display an alert or message to a vehicle occupant and/or control the vehicle to reduce power consumption to increase vehicle driving range.

16 Claims, 5 Drawing Sheets

(51) Int. Cl.
*B60L 50/60* (2019.01)
*G06N 3/088* (2023.01)
*G06N 3/094* (2023.01)
*G07C 5/00* (2006.01)
*B60K 6/28* (2007.10)
*B60K 35/00* (2006.01)
*B60K 35/28* (2024.01)
*B60W 20/00* (2016.01)

(52) U.S. Cl.
CPC ............ *G06N 3/088* (2013.01); *G06N 3/094* (2023.01); *G07C 5/004* (2013.01); *B60K 6/28* (2013.01); *B60K 35/00* (2013.01); *B60K 35/28* (2024.01); *B60L 2240/40* (2013.01); *B60L 2240/54* (2013.01); *B60W 20/00* (2013.01); *B60Y 2200/91* (2013.01); *B60Y 2200/92* (2013.01)

(58) Field of Classification Search
CPC ............ B60L 2240/40; B60L 2240/54; B60L 2240/66; B60L 2240/68; B60L 2240/70; B60K 6/28; B60K 35/00; B60K 35/28; B60K 2360/166; B60Y 2200/91; B60Y 2200/92; B60W 20/00
See application file for complete search history.

(56) References Cited

U.S. PATENT DOCUMENTS

| | | | | |
|---|---|---|---|---|
| 2018/0257666 | A1* | 9/2018 | Bryan | B60L 1/02 |
| 2019/0143832 | A1* | 5/2019 | Birek | B60L 58/13 701/22 |
| 2019/0354804 | A1* | 11/2019 | Ros Sanchez | G06F 18/2148 |
| 2020/0226850 | A1* | 7/2020 | Bower | B60Q 9/00 |
| 2021/0049832 | A1* | 2/2021 | Maeda | G07C 5/004 |
| 2021/0146785 | A1* | 5/2021 | Wang | G06N 20/00 |
| 2021/0217252 | A1* | 7/2021 | Maeda | G06Q 30/0283 |
| 2022/0009472 | A1* | 1/2022 | Books | B60W 20/13 |
| 2022/0055488 | A1* | 2/2022 | Aslandere | B60K 35/10 |

OTHER PUBLICATIONS

Makhzani et al., "Adversarial Autoencoders" May 25, 2016, arXiv: 1511.05644v2, pp. 1-16. (Year: 2016).*
Chakraborty et al., "Stochastic Virtual Battery Modeling of Uncertain Electrical Loads using Variational Autoencoder" Mar. 18, 2020, arXiv: 2003.08461, pp. 1-6. (Year: 2020).*
Modi et al., "Estimation of energy consumption of electric vehicles using Deep Convolutional Neural Network to reduce driver's range anxiety" Sep. 4, 2019, pp. 454-470. (Year: 2019).*
Ren et al., "Remaining Useful Life Prediction for Lithium-Ion Battery: A Deep Learning Approach" Oct. 8, 2018, pp. 50587-50598. (Year: 2018).*
Ng et al., "Predicting the State of Charge and Health of Batteries using Data-Driven Machine Learning" Jun. 12, 2020, pp. 1-22. (Year: 2020).*
Schwenk et al., "Data-driven charging strategies for grid-beneficial, customer-oriented and battery-preserving electric mobility" Oct. 14, 2019, arXiv: 1910.07503v1, pp. 1-12. (Year: 2019).*
Jafari et al., "Hierarchical Bayesian Model for Probabilistic Analysis of Electric Vehicle Battery Degradation" Nov. 4, 2019, arXiv: 1911.01399v1, pp. 1-12. (Year: 2019).*
Pan et al., "Data-Driven EV Load Profiles Generation Using a Variational Auto-Encoder" Mar. 5, 2019, pp. 1-1-15. (Year: 2019).*
Makhzani, Alireza et al. Adversarial Autoencoders. International Conference on Learning Representations. May 25, 2016. 16 pages.
Range Anxiety. Wikipedia The Free Encyclopedia. Aug. 11, 2021. https://en.wikipedia.org/wiki/Range_anxiety.
Kim, Eugene et al. Real-time prediction of battery power requirements for electric vehicles.013 ACM/IEEE International Conference on Cyber-Physical Systems (ICCPS), 2013. 10 pages.
Ress, Christian et al. Electronic Horizon—Providing Digital Map Data for ADAS Applications. Ford Research & Advanced Engineering Europe Suesterfeldstr. 200, 52072 Aachen, Germany. 10 pages.

* cited by examiner

ELECTRIFIED VEHICLE WITH INDICATION OF ADEQUATE DRIVING RANGE BASED ON AUTOENCODER

CROSS-REFERENCE TO RELATED APPLICATIONS

This application claims foreign priority benefits under 35 U.S.C. § 119(a)-(d) to DE Application 10 2020 210 561.8 filed Aug. 20, 2020, which is hereby incorporated by reference in its entirety.

TECHNICAL FIELD

This disclosure relates to an electrified vehicle and method that use an autoencoder to determine vehicle driving range.

BACKGROUND

Electrified vehicles may be designed as battery electric vehicles (BEVs) that are pure electric vehicles solely powered by a battery or similar electric store or hybrid electric vehicles (HEVs) that include an engine in addition to a battery or other electric store. Hybrid vehicles designed as plug-in hybrids (PHEV) allow charging of the traction battery from the power grid in contrast to other hybrid vehicles that recover energy by operating an electric machine as a generator, for example while driving with the combustion engine, in order to charge the traction battery.

Range anxiety is understood to be the fear of the driver that the range of a motor vehicle might not be sufficient to complete the current journey, i.e. being stranded on the route because of an empty traction battery or fuel. Range anxiety can arise even in the case of hybrid vehicles that are not designed as plug-in hybrids, namely if a predetermined route may be driven emission-free and therefore only electrically due to environmental regulations, for example.

There is therefore a need to identify ways to reduce range anxiety.

SUMMARY

One or more embodiments according to the disclosure provide an electrified vehicle and/or method for operating an electrified vehicle having at least one traction battery-powered electric machine, including training an autoencoder with training data indicative of a remaining range of a traction battery powering the electric machine, storing operating data of the electrified motor vehicle, loading the trained autoencoder with the read-in operating data to generate a reference data set, determining a value indicative of a similarity between the read-in operating data and the reference data provided by the trained autoencoder, and creating an output data record if the value indicative of a similarity is below a predetermined threshold value. The output data record provides an indication of whether the driving range is adequate for the current trip without calculating a numerical distance value of range or comparing a numerical range value with a distance to a destination. Rather, the output data record provides a binary indication of whether the driving range is adequate for the current trip.

An autoencoder is a device or algorithm which provides an encoded representation of an original input that may be used to generate output similar to the original input based on the encoded representation. Thus, an autoencoder with an encoder and a decoder is first trained during a training phase to map training data onto reference data, in other words to provide copies of the training data as reference data. During the training, the autoencoder's ability to detect differences between the training data and the reference data is exploited to achieve learning progress. The same ability to detect differences between the training data and the reference data is used in normal operation after the completion of the training phase to record deviations between current operating data and reference data. Such deviations are considered to be anomalies which are considered indicative of an excessively low traction battery capacity or remaining range in an electrified vehicle according to embodiments of this disclosure. Thus, detection of the traction battery capacity or the remaining amount of residual energy is dispensed with, but insufficient traction battery capacity or remaining range is concluded indirectly. In this way, range anxiety can be counteracted in a particularly simple and at the same time reliable way.

According to one embodiment, the electrified vehicle includes one or more controllers or processors that include stored data representing instructions and related information to implement a generative adversarial autoencoder. In various embodiments, a cloud-based processor or network implements a generative adversarial autoencoder and wirelessly transmits and receives range-related data to/from an electrified vehicle. Such a generative adversarial autoencoder can also be understood as a probabilistic autoencoder. The autoencoder has a generative neural network with a first and a second artificial neural network. The first artificial neural network is designed as a generator and the second artificial neural network is designed as a discriminator. During a training phase, the generator and the discriminator perform a zero-sum game. The generator generates reference data, for example based on random values, while the discriminator evaluates the reference data. For this purpose, the discriminator performs a comparison of the reference data with real data records. The generative adversarial network is used to update the decoder. The discriminator allows a particularly reliable detection of such deviations in contrast to artificial neural networks for example, such as deep neural networks.

According to a further embodiment, the autoencoder is trained by unsupervised learning. Unsupervised learning is a variant of machine learning without pre-known target values and without environmental reward. A learning algorithm attempts to detect patterns in the input data that deviate from unstructured noise. The artificial neural network orients itself to the similarity to the input values and adapts its weighting factors accordingly. In this way the effort required to prepare the learning data used to access the artificial neural network during the training phase can be reduced. The artificial neural network can also be trained through supervised learning, semi-supervised learning or reinforcement learning.

According to a further embodiment, the output data record is transmitted wirelessly to the electrified motor vehicle. In other words, the output data record is determined and provided by a server or cloud and then transmitted wirelessly to the motor vehicle. In this way, particularly computational and thus energy-intensive calculation steps do not have to be carried out in the motor vehicle. In this way, the demand for computer resources in the motor vehicle and also the energy requirements in the motor vehicle can be kept to a minimum.

According to a further embodiment, the output data record is evaluated in the motor vehicle to generate a signal for informing a driver of the motor vehicle and or a control signal for controlling the drive train. On the one hand, the driver can be informed that the battery capacity may not be sufficient to reach the destination of the next trip. On the other hand, the control signal can be used to change operating parameters of the drive train of the motor vehicle to enable more energy-efficient operation and thus maximize the range of the traction battery.

Embodiments include a computer program product for a data processing unit, a computer program product for an electrified motor vehicle, a system, a method, and a data processing unit implementation of an autoencoder that determines a driving range for an electrified vehicle.

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
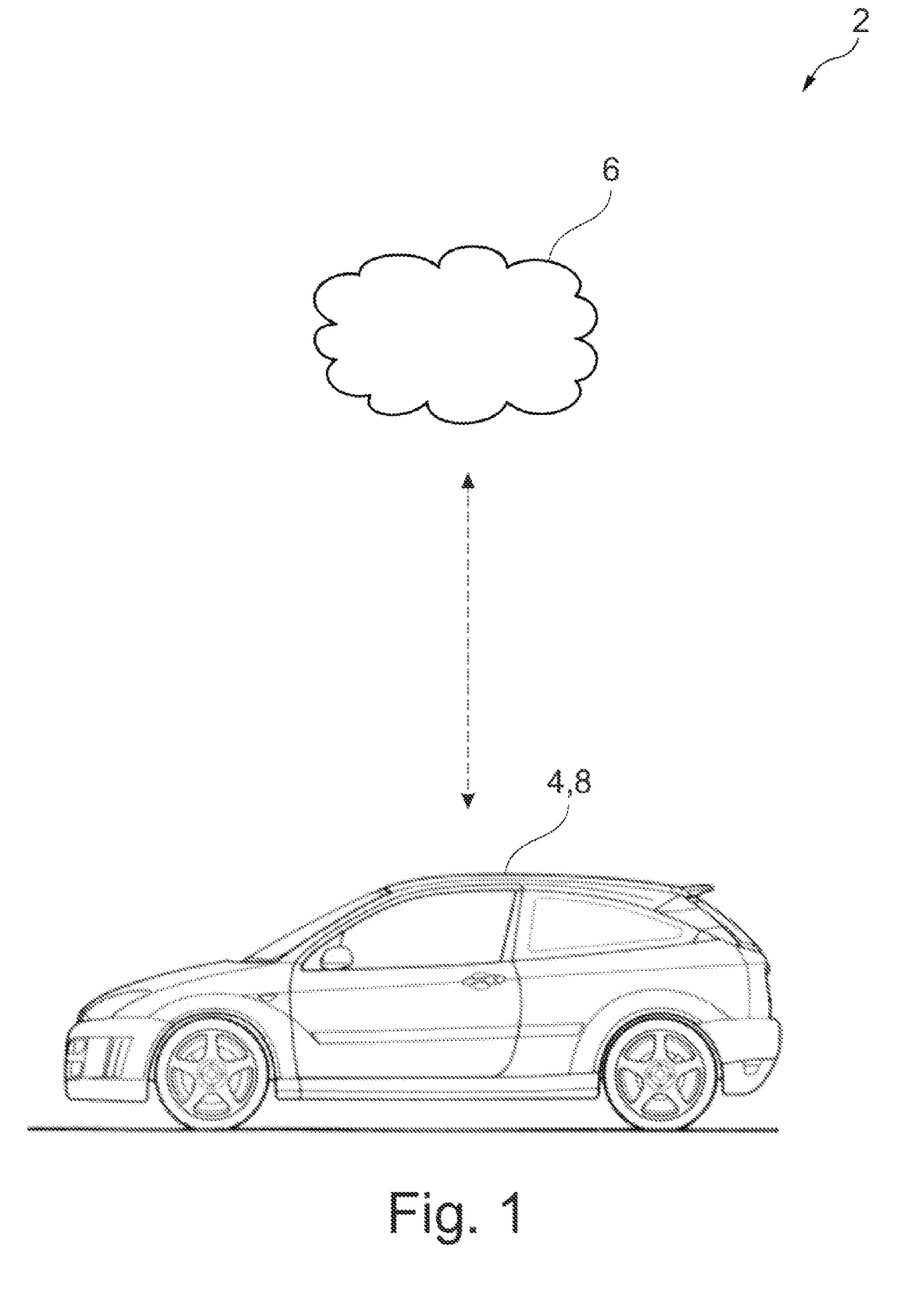
FIG. 1 is a schematic representation of a representative system or method for vehicle range determination of an electrified vehicle.

Referring to FIG. 1, a system 2 for the operation of an electrified motor vehicle 4 is shown. In addition to the motor vehicle 4, the system 2 comprises a controller or data processing unit 6. The motor vehicle 4 and the data processing unit 6 are designed for wireless data exchange, for example using a 5G network. In the representative embodiment of FIG. 1, the electrified motor vehicle 4 is designed as either a battery electric vehicle (BEV) or as a hybrid vehicle (HEV), such as a plug-in hybrid (PHEV). In other words, the motor vehicle 4 has a drive train 8 with at least one traction battery-powered electric machine that may be selectively operated as a generator or traction motor.

The drive train 8 comprises all components that generate the power for the drive in the motor vehicle 4 and transfer it to the ground. The data processing unit 6 can be a server or a cloud computer or a computer network. For the tasks of the system 2 described below, i.e. the motor vehicle 4 and the data processing unit 6, this or these have hardware and/or software components. The various hardware and software components described may have one or more associated controllers, processors, or computers to control and monitor operation of the components and implement an autoencoder based on sensor data associated with one or more vehicle components. The controllers, computers, processors, etc. may communicate via a vehicle network that may be implemented as a serial bus (e.g., Controller Area Network (CAN)) or via discrete conductors in addition to wirelessly as previously described.

It should be understood that any one of the representative data processing units or controllers can collectively be referred to as a data processing unit, controller, computer, etc. that controls various actuators in response to signals from various sensors to control the vehicle in response to stored instructions processed or executed by one or more microprocessors, some of which may implement an autoencoder as described herein. Each data processing unit may include a microprocessor or central processing unit (CPU) in communication with various types of memory or non-transitory computer readable storage devices or media. Computer readable storage devices or media may include volatile and nonvolatile or persistent storage in read-only memory (ROM), random-access memory (RAM), and keep-alive memory (KAM), for example. KAM is a persistent or non-volatile memory that may be used to store various operating variables while the processor is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in generating display messages or signals and controlling the vehicle via various vehicle components or subsystems.

Control logic, functions, code, software, strategy etc. performed by one or more processors or controllers may be represented by block diagrams, flow charts, or similar diagrams in one or more figures. These figures provide representative control strategies, algorithms, and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular function being performed and processing strategy being used. Similarly, the order of processing is not necessarily required to achieve the features and advantages described herein, but is provided for ease of illustration and description. The control logic may be implemented primarily in software executed by a microprocessor-based data processing unit located on-board the vehicle or remotely in the cloud. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer to implement an autoencoder to control the vehicle or its subsystems or cause a message or alert to be displayed. The computer-readable storage devices or media may include one or more of a number of known physical devices which utilize electric, magnetic, and/or optical storage to keep executable instructions and associated calibration information, operating variables, and the like.

Figure 2:
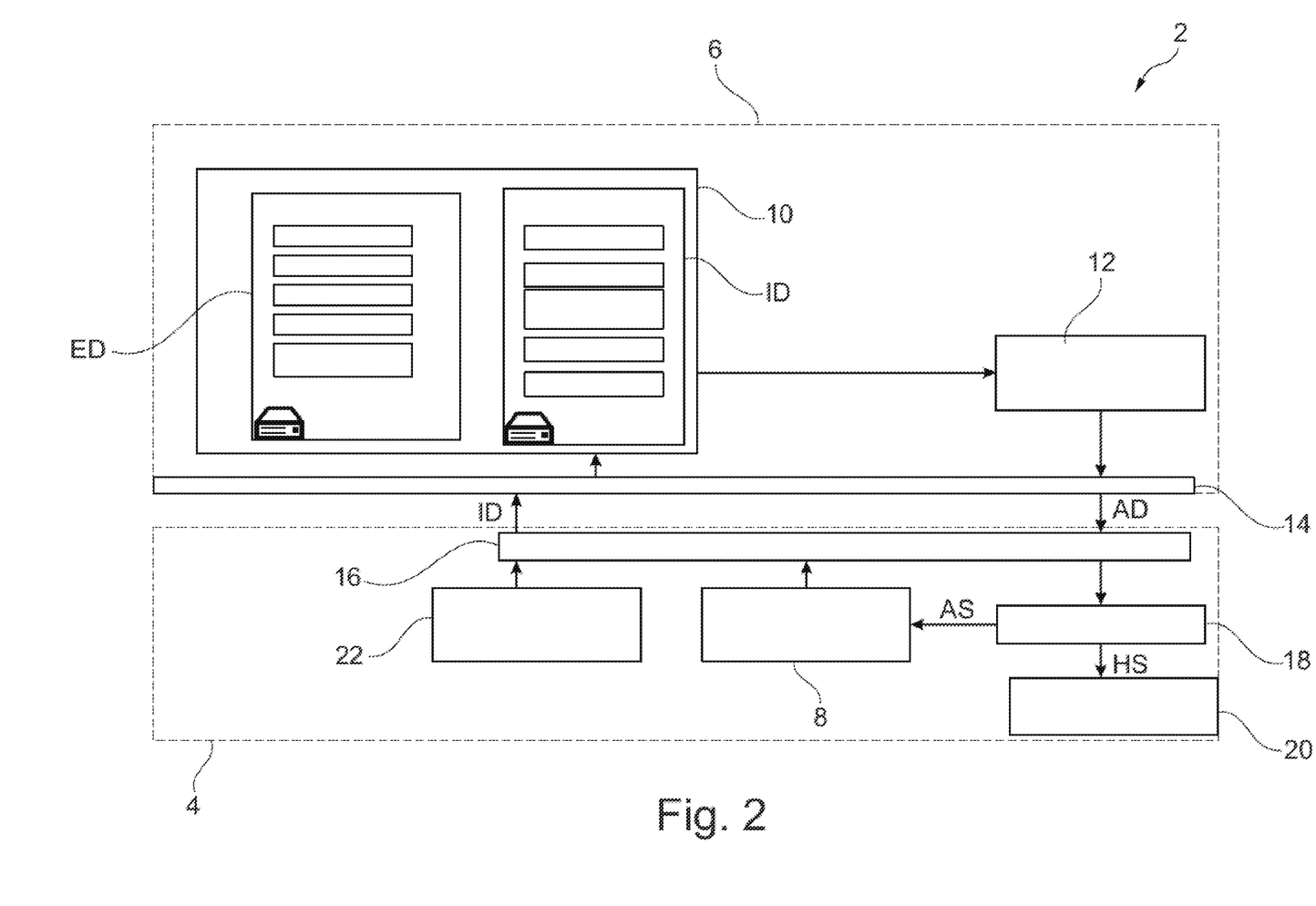
FIG. 2 is a schematic representation with additional details of the system or method of FIG. 1.

Referring to FIG. 2, the data processing unit 6 is designed to read external data (ED) and internal data (ID) and to temporarily store and evaluate the data in a memory 10, as explained in detail herein. External data ED may include traffic data, weather data, calendar data, telephone connection data, or charging station data, for example. The internal data ID, on the other hand, may include vehicle sensor data, navigation data, drive train parameters, user data and Electronic Horizon Data, for example.

The traffic data can be for example indicative of a traffic jam corresponding to the current GPS location of the vehicle 4. The traffic data can be accessed directly from a satellite or online. The traffic data can also be read via V2V (Vehicle to Vehicle) or V2I (Vehicle to Infrastructure) communication.

The weather data can come from weather stations and are indicative of expected daytime temperatures. The weather data can be accessed directly from satellites or online or read in via V2V (Vehicle to Vehicle) or V2I (Vehicle to Infrastructure) communication.

The calendar data contain information from a digital calendar of the driver. This does not include private information, but the availability of the driver for a journey. For example, the motor vehicle 4 is not used in 8 hours due to business hours, or a journey with a certain distance is planned in the next hours/days. No travel details are given, but only information representative of a route or distance to the destination.

The phone connection data are, for example, representative of a number of calls or messages in a single day to estimate whether there is a possible journey.

Charging station data contain, for example, data from the providers of charging stations. They include the GPS position of nearby charging stations and the distance of charging stations as well as data indicative of their occupancy and use.

The sensor data come from vehicle-side sensors 18 of the motor vehicle 4, such as a GPS, cameras, radar or lidar systems, gyroscopes and similar sensors. The sensor data can describe a distance to the nearest motor vehicle, a route, an inclination or slope of the road or the number of lanes.

The navigation data contain information from digitized maps to determine whether the motor vehicle 4 is on a motorway or within a city or on a long route without an exit. For the determination, GPS information can be evaluated additionally, for example.

The drive train parameters are provided by the motor control unit, for example, and are indicative of the energy consumed during a journey and the remaining energy reserve, as well as of related data such as torque and speed.

The user data relate to the driver and/or driving profile. For this purpose, travel times and the length of journeys or even days of the week of journeys can be evaluated.

The Electronic Horizon Data are based at least on the navigation data or the digitized maps to predict a driving route and road conditions. The Electronic Horizon Data include road gradients, road type, road slope, and speed limits.

In other words, the external data ED can be considered as vehicle-independent data and the internal data ID can be understood as motor vehicle data or also as motor vehicle operating data.

Furthermore, of the components of the data processing unit 6, FIG. 2 shows an autoencoder 12, which is designed in the present representative embodiment as a generative adversarial autoencoder (see also Adversarial Autoencoders, Alireza Makhzani and Jonathon Shlens and Navdeep Jaitly and Ian Goodfellow and Brendan Frey, International Conference on Learning Representations 2016, https://ai.google/research/pubs/pub44904) and shows a network layer 14 for bidirectional data exchange with the modem 16 via wireless data transmission. In particular, the structure and function of the autoencoder 12 are explained below on the basis of FIGS. 3 and 4.

Of the components of the motor vehicle 4, in addition to the drive train 8, a modem 16 for wireless data transmission, a battery management system 18 for the operation of the traction battery and an HMI (human machine interface) for informing the driver of the motor vehicle 4 as well as vehicle-side sensors 22 are shown in FIG. 2.

In operation, the captured internal data ID are transmitted wirelessly to the data processing unit 6 via the modem 16 and read in by the network layer 14 and then temporarily stored in the memory 10. Furthermore, an output data record AD provided by the data processing unit 6 is read in with the modem 16 and then evaluated by the battery management system 18 to inform the driver of the vehicle 4 by outputting via the HMI 20 and/or to generate a control signal AS for controlling the drive train 8 in order to reduce the energy consumption. The HMI 20 may be designed to inform the driver by means of an acoustic and or optical and or haptic signal.

Figure 3:
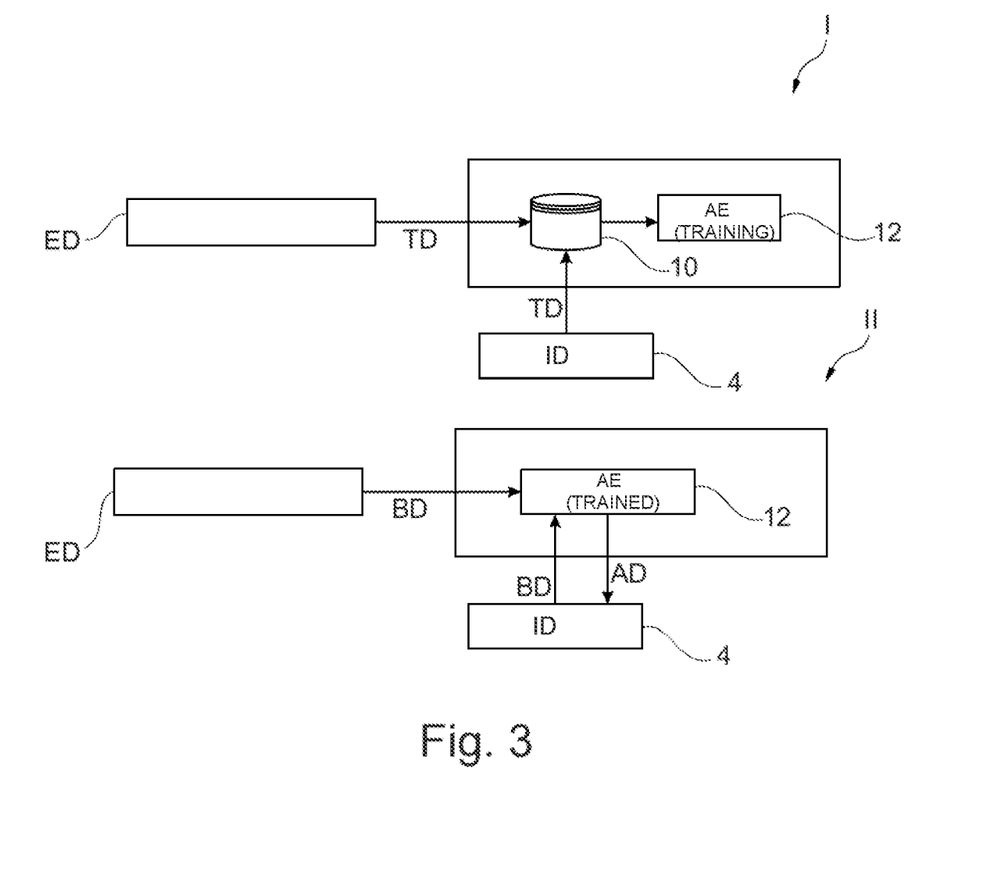
FIG. 3 is a schematic representation with additional details of the system or method of FIG. 1.

As generally illustrated in FIG. 3, during a training phase I, the external data ED and the internal data ID serve as training data TD for the autoencoder (AE) 12, being temporarily stored in the memory 10 and used for training the autoencoder 12. On the other hand, when the training of the autoencoder 12 has been completed as illustrated in phase II of FIG. 3, the current external data ED and the current internal data ID are taken as operating data BD, which are fed to the now trained autoencoder 12. As the output, the trained autoencoder 12 now provides the output data record AD.

Figure 4:
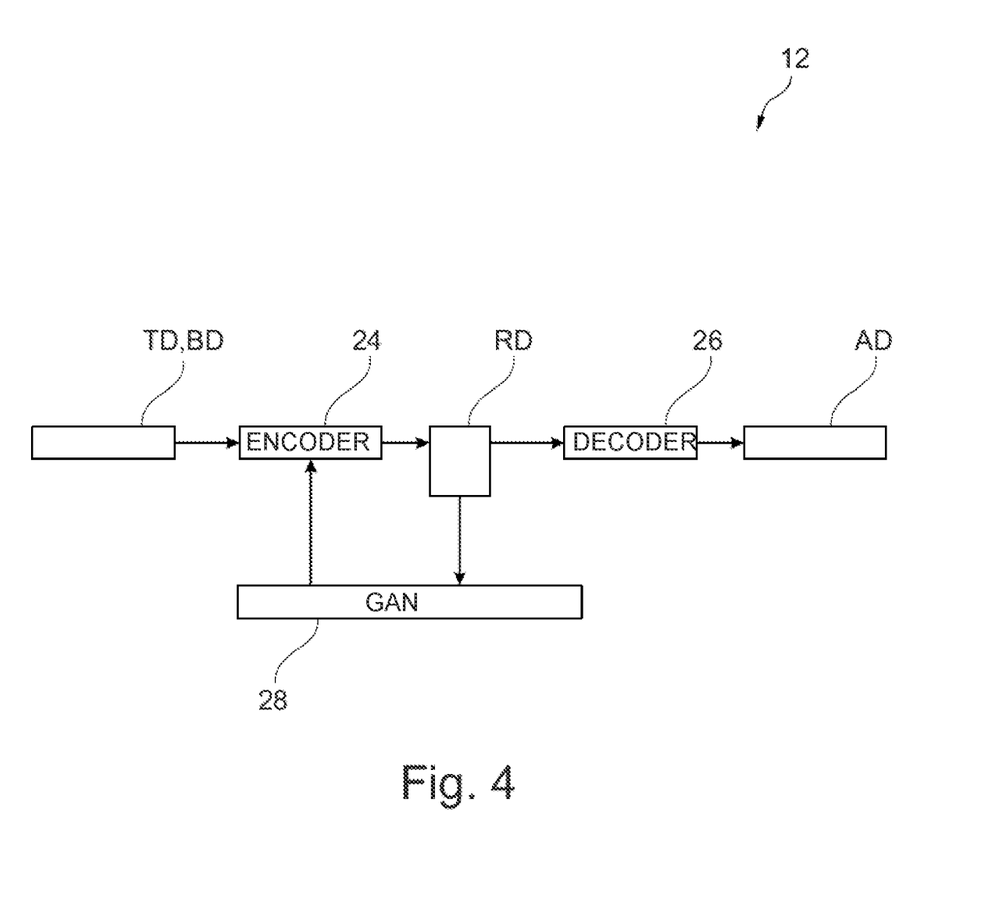
FIG. 4 is a schematic representation with additional details of operation of the system or method shown in FIG. 1.

Reference is now additionally made to FIG. 4 and further details of the autoencoder 12 are explained. The autoencoder 12, which in one representative embodiment is in the form of a generative adversarial autoencoder, has an encoder 24, a decoder 26 and a generative adversarial network (GAN) 28.

An autoencoder algorithm is designed to provide a representation of the original input, i.e. the training data TD or operating data BD using the encoder 24 and the decoder 26.

After the training phase I with the training data TD, a copy of the input, then the operating data BD, is simply provided as the output in the normal phase II. If the particular copy differs from the original data record, an anomaly can be concluded.

In operation, the decoder 26 provides the output data record AD as the output variable, which can be or may contain a logical variable, which is assigned the value logical zero for a sufficient traction battery capacity or remaining range and the value logical one for insufficient traction battery capacity or remaining range.

The logical variable is assigned the logical value one, for example during the training phase I, if the decoder 26 cannot distinguish reference data RD from the training data TD within predetermined limits or accuracy. Otherwise, the logical variable is assigned the value logical zero during the training phase I.

For this purpose—as is later explained by FIG. 5—a value W is determined indicative of a similarity between the read-in current operating data BD and the reference data RD provided by the trained autoencoder 22. The output data record AD is generated if the value W indicative of a similarity is below a predetermined threshold value SW.

The generative adversarial network 28 has a first and a second artificial neural network. The first artificial neural network is in the form of a generator and the second artificial neural network is in the form of a discriminator.

The first artificial neural network, the generator, creates candidates, while the second artificial neural network, the discriminator, evaluates the candidates. Typically, the generator maps from a vector of latent variables to the desired result space. The goal of the generator is to learn to generate results according to a certain distribution. The discriminator, on the other hand, is trained to distinguish the results of the generator from the data from the real, predetermined distribution. The target function of the generator is then to generate results that the discriminator cannot distinguish. As a result, the generated distribution will gradually conform to the real distribution.

The generative adversarial network 28 is used to continuously update the decoder 24 in operation by evaluating the reference data RD.

The generative adversarial network 28 and the autoencoder 12 are trained together in two subphases. In the first phase, the autoencoder 12 updates the encoder 24 and decoder 26 to minimize a reconstruction error of the input data. In the second phase, the generative adversarial network 28 is updated to distinguish real input data from generated input data, i.e. the data provided by the autoencoder 12. The generative adversarial network 28 then updates its generator to stimulate the generative adversarial network 28 again.

In the present representative embodiment, the autoencoder 12 is trained by means of unsupervised learning. In a departure from the present embodiment, however, training can also be carried out by means of supervised learning, semi-supervised learning or reinforcement learning.

After completing the training phase I, the decoder 26 of the autoencoder 12 forms a generative model, which maps input data to a data distribution. In normal operation II, when the generator 24 is loaded with the operating data BD, it can thus be detected whether there is a deviation or anomaly, which is then considered indicative of insufficient traction battery capacity or remaining range.

Figure 5:
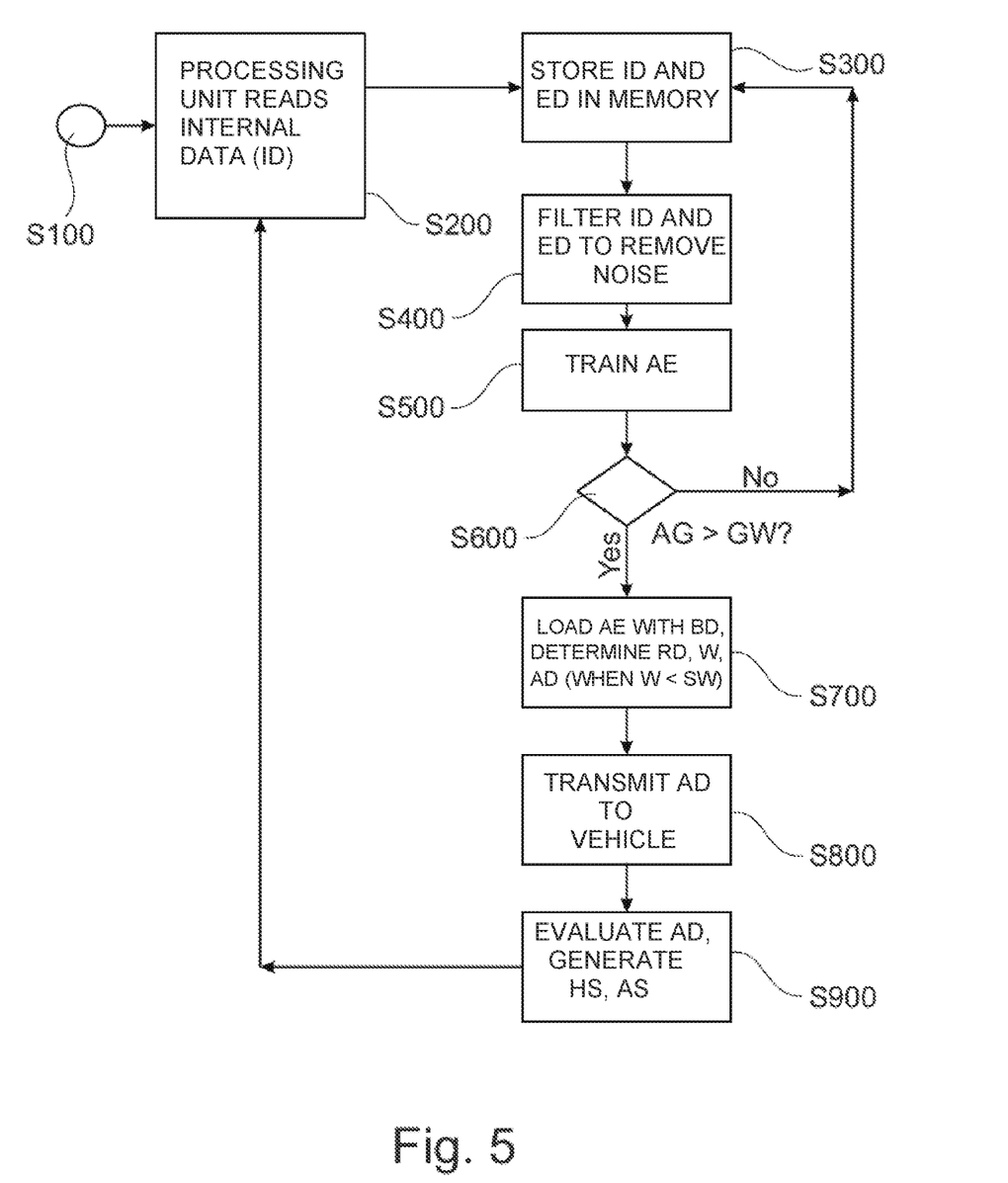
FIG. 5 shows is a flowchart illustrating operation of a system or method for electrified vehicle range determination as shown in FIG. 1.

A procedure for the operation of the system 2 is now explained with additional reference to FIG. 5. In a first step, S100, the method is started. In a further step S200, the data processing unit 6 reads the internal data ID. In a further step S300, the read-in internal data ID and the external data ED are temporarily stored in the memory 10. In a further step S400, the read-in internal data ID and the external data ED are fused and filtered to remove noise components. In a further step S500, the training phase I for training the autoencoder 12 is carried out.

In a further step S600 it is checked whether the training was successful or not. For this purpose, the precision AG of the autoencoder 12 is compared with a predetermined limit value GW. If the precision AG is less than or equal to the limit value GW, the training is continued, i.e. the procedure is continued with step S200. If the precision AG is above the limit value GW, the procedure is continued with a further step S700.

In the next step S700, the trained autoencoder 12 is loaded with the read-in current operating data BD and then provides a reference data record RD. Furthermore, the autoencoder 12 determines the value W indicative of a similarity between the read-in operating data BD and the reference data RD provided by the trained autoencoder 12 and generates the output data record AD if the value W indicative of a similarity is below the predetermined threshold value SW. In a further step S800, the output data record AD is transmitted wirelessly to the motor vehicle 4. In a further step S900, the output data record AD is evaluated in the motor vehicle 4 in order to generate the signal HS for informing a driver of the motor vehicle 4 and or the control signal AS for controlling the drive train 8. Furthermore, the procedure will then continue with the next step S200.

In a departure from the present embodiment, the order of the steps may also be different. In addition, multiple steps can also be performed at the same time or simultaneously. Furthermore, in a departure from the present embodiment, individual steps can be skipped or omitted.

Thus, a detection of the traction battery capacity or the remaining residual amount of energy is dispensed with, but insufficient traction battery capacity or remaining range is concluded indirectly. In this way, range anxiety can be counteracted in a particularly simple and at the same time reliable way.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. A method for controlling an electrified vehicle having an electric machine powered by a traction battery, the method comprising:
   training an autoencoder with training data indicative of a remaining vehicle driving range associated with the traction battery, the training data including internal data and external data;
   processing electrified vehicle operating data by the autoencoder and generating a reference data record based on the operating data;
   generating an output data record by the autoencoder in response to a value indicative of similarity between the electrified vehicle operating data and the reference data record provided by the trained autoencoder being below a predetermined threshold value, the output data record including a binary indication of whether driving range is adequate for a current trip, the output data record generated based on detecting deviation between the operating data and reference data to minimize a reconstruction error; and
   controlling the electrified vehicle drive train to reduce energy consumption in response to the output data record.

2. The method of claim 1 wherein controlling the electrified vehicle comprises reducing electric load on the traction battery.

3. The method of claim 1 wherein controlling the electrified vehicle comprises displaying a message that the traction battery capacity may not be sufficient to reach a designated destination.

4. The method of claim 1 wherein the autoencoder comprises a generative adversarial autoencoder implemented by a remote server, and wherein the output data record is wirelessly transmitted by the remote server to the electrified vehicle.

5. The method of claim 4 further comprising training the autoencoder by unsupervised learning.

6. The method of claim 1 wherein the electrified vehicle comprises one or more controllers and wherein the one or more controllers process stored data representing instructions to implement the autoencoder.

7. The method of claim 6 wherein the autoencoder comprises a generative adversarial autoencoder.

8. The method of claim 1 wherein training the autoencoder comprises wirelessly transmitting the internal data and the external data to the autoencoder wherein the internal data include data from at least one of vehicle sensor data, navigation data, drive train parameters, and user data, and the external data include at least one of traffic data, weather data, calendar data, telephone connection data, and charging station data.

9. An electrified vehicle comprising:
a traction battery;
an electric machine powered by the traction battery and configured to provide propulsive force to the electrified vehicle;
a human-machine interface (HMI); and
a controller configured to communicate with the HMI to control the electric machine in response to an output data record from an autoencoder trained using vehicle data associated with a driving range of the electrified vehicle, the output data record generated in response to a value indicative of similarity between electrified vehicle operating data and reference data being below a predetermined threshold value, the output data record including a binary indication of whether the driving range is adequate for a current trip destination based on detecting deviation between the operating data and reference data to minimize a reconstruction error.

10. The electrified vehicle of claim 9 wherein the controller reduces accessory load of the electrified vehicle in response to the output data record indicating the driving range is less than a current trip destination.

11. The electrified vehicle of claim 9 wherein the controller causes display of a message on the HMI that current traction battery charge may not be sufficient to reach a designated destination in response to the output data record indicating the driving range is insufficient.

12. The electrified vehicle of claim 9 wherein the controller is further configured to wirelessly receive the output data record from a remotely located autoencoder.

13. The electrified vehicle of claim 12 wherein the remotely located autoencoder is trained by unsupervised learning.

14. The electrified vehicle of claim 9 wherein the autoencoder is implemented by the controller.

15. The electrified vehicle of claim 9 wherein the autoencoder comprises a generative adversarial autoencoder including a first artificial neural network designed as a generator and a second artificial neural network designed as a discriminator.

16. A non-transitory computer readable storage medium including stored data representing instructions executable by a processor to:
implement a trained autoencoder that generates an output data record in response to a value indicative of similarity between electrified vehicle operating data and reference data being below a predetermined threshold value, the output record including a binary indication of whether the driving range is adequate for a current trip destination, the autoencoder trained using electrified vehicle operating data associated with an electrified vehicle driving range;
reduce electrified vehicle accessory load in response to the output data record and a predetermined electrified vehicle destination; and
control the electrified vehicle in response to the value indicative of similarity being below the predetermined threshold value.

\* \* \* \* \*